US007646260B2

(12) United States Patent
Prikhodko et al.

(10) Patent No.: US 7,646,260 B2
(45) Date of Patent: *Jan. 12, 2010

(54) SWITCHING DEVICE WITH SELECTABLE PHASE SHIFTING MODES FOR REDUCED INTERMODULATION DISTORTION

(75) Inventors: Dima Prikhodko, Woburn, MA (US); Sergey Nabokin, Pelham, NH (US); Oleksey Klimashov, Burlington, MA (US); Steven C. Sprinkle, Hampstead, NH (US); Gene A. Tkachenko, Belmont, MA (US); Richard A. Carter, Hampton, NH (US)

(73) Assignee: Skyworks Solutions, Inc., Woburn, MA (US)

( * ) Notice: Subject to any disclaimer, the term of this patent is extended or adjusted under 35 U.S.C. 154(b) by 141 days.

This patent is subject to a terminal disclaimer.

(21) Appl. No.: 11/827,780

(22) Filed: Jul. 13, 2007

(65) Prior Publication Data

US 2009/0015347 A1    Jan. 15, 2009

(51) Int. Cl.
*H01P 1/15* (2006.01)
*H01P 1/18* (2006.01)
(52) U.S. Cl. .................. 333/104; 333/161
(58) Field of Classification Search ............ 333/103, 333/104, 161
See application file for complete search history.

(56) References Cited

U.S. PATENT DOCUMENTS

| | | | |
|---|---|---|---|
| 5,095,285 A | 3/1992 | Khatibzadeh | |
| 5,528,196 A | 6/1996 | Baskin et al. | |
| 5,644,268 A | 7/1997 | Hang | |
| 5,969,582 A | 10/1999 | Boesch et al. | |
| 6,163,713 A * | 12/2000 | Suzuki et al. | ............ 505/210 |
| 6,560,443 B1 | 5/2003 | Vaisanen et al. | |
| 6,642,578 B1 | 11/2003 | Arnold et al. | |
| 6,803,680 B2 | 10/2004 | Brindle et al. | |
| 6,804,502 B2 | 10/2004 | Burgener et al. | |
| 6,829,471 B2 | 12/2004 | White et al. | |
| 6,835,968 B2 * | 12/2004 | Kitazawa et al. | ............ 257/107 |

(Continued)

FOREIGN PATENT DOCUMENTS

JP    1997-083259 A    3/1997

OTHER PUBLICATIONS

"Digital Cellular Telecommunications System (Phase 2+)", Radio Transmission and Reception, 3GPP TS 05.05 version 8.6.0 Release 1999, pp. 1-95, Sep. 2000.

(Continued)

*Primary Examiner*—Robert Pascal
*Assistant Examiner*—Alan Wong
(74) *Attorney, Agent, or Firm*—Lando & Anastasi, LLP

(57) ABSTRACT

According to one exemplary embodiment, a switching device with phase selection terminals to select between at least two phase shifting modes to reduce intermodulation distortion in the switching device includes a first phase selection terminal to select a first phase shifting mode of the switching device by enabling a first transmission line in a first phase shifting switching branch coupled to an input of the switching device. The switching device further includes a second phase selection terminal to select a second phase shifting mode of the switching device by enabling a second phase shifting switching branch coupled to the switching device input. The intermodulation distortion in the switching device is reduced by selecting one of the first and second phase shifting modes. The first transmission line is enabled by enabling a FET coupled in series with the first transmission line in the first phase shifting switching branch.

20 Claims, 5 Drawing Sheets

U.S. PATENT DOCUMENTS

| | | | |
|---|---|---|---|
| 6,876,258 | B2 | 4/2005 | Ohta et al. |
| 6,917,259 | B2 | 7/2005 | Hirabayashi |
| 7,076,216 | B2 | 7/2006 | Hiyashi |
| 7,088,971 | B2 | 8/2006 | Bergener et al. |
| 7,098,755 | B2 | 8/2006 | Zhao et al. |
| 7,098,759 | B2 | 8/2006 | Chang |
| 7,180,758 | B2 | 2/2007 | Lincoln et al. |
| 7,199,635 | B2 | 4/2007 | Nakatsuka et al. |
| 7,202,736 | B1 | 4/2007 | Dow et al. |
| 7,206,551 | B2 | 4/2007 | Itakura et al. |
| 7,239,853 | B2 | 7/2007 | Kearns |
| 7,259,643 | B2 | 8/2007 | Son et al. |
| 7,391,283 | B2 * | 6/2008 | Kearns ................. 333/103 |
| 7,417,515 | B2 * | 8/2008 | Chominski .............. 333/105 |
| 7,459,988 | B1 * | 12/2008 | Iversen ................. 333/103 |
| 7,479,844 | B2 * | 1/2009 | Kormanyos ............. 333/103 |
| 7,492,209 | B2 | 2/2009 | Prikhodko et al. |
| 2005/0012400 | A1 | 1/2005 | Gresham |
| 2005/0282503 | A1 | 12/2005 | Onno et al. |
| 2006/0051038 | A1 | 3/2006 | Imai et al. |
| 2008/0079513 | A1 | 4/2008 | Prikhodko et al. |
| 2008/0079514 | A1 | 4/2008 | Prihodko et al. |
| 2008/0180189 | A1 * | 7/2008 | Miya .................. 333/103 |
| 2009/0015508 | A1 * | 1/2009 | Prikhodko et al. ......... 343/876 |

OTHER PUBLICATIONS

Gotch et al., "State-of-the-Art Low Loss, High Isolation SP6T Switch for Handset Applications", European Conference on Wireless Technology, 17-20 (2004).

Holm et al., "Charge Effects and Transient Simulation of p-HEMT Meander Gate Switches" EuMA, Sep. 2006, pp. 367-370.

Kohama et al., "High Power DPDT Antenna Switch MMIC for Digital Cellular System", IEEE Journal of Solid State Circuits, vol. 31, No. 10, Oct. 1996, pp. 1406-1411.

Masuda et al., "High Power Heterojunction GaAs Switch IC with P-1dB of more than 38dBm for GSM Application", IEEE, 1998, pp. 229-232.

Shifin et al., "Monolithic FET Structures for High-Power Control Component Applications", IEEE Transactions on Microwave Theory and Techniques, vol. 37, No. 12, Dec. 1989, pp. 2134-2141.

Yasuda, et al., An Ultra-Low Distortion 3P2T Antenna Switch MMIC for Dual-band W-CDMA Applications, IEEE, 2005, pp. 445-458.

* cited by examiner

SWITCHING DEVICE WITH SELECTABLE PHASE SHIFTING MODES FOR REDUCED INTERMODULATION DISTORTION

BACKGROUND OF THE INVENTION

1. Field of the Invention

The present invention is generally in the field of electrical circuits. More specifically, the invention is in the field of high-frequency switching circuits.

2. Related Art

High-frequency switching devices, such as high-frequency switching devices having multiple inputs and a shared output, can be used in mobile communication devices, such as cellular handsets, to provide operation at more than one frequency. For example, a high-frequency switching device can be used in a cellular handset operating in a system using a Global System for Mobile Communications (GSM) communications standard to enable the cellular handset to operate either at a low band frequency of 900.0 MHz or a high band frequency of 1800.0 MHz by selectively coupling a corresponding input to the shared output. For high-frequency switching devices, such as high-frequency switching devices used in mobile communication devices, there is a continuing need to reduce intermodulation distortion (IMD).

A conventional high-frequency switching device can include two or more switching arms, where each switching arm can include a number of field effect transistors (FETs) coupled between an input and a shared output of the switch. Each switching arm can be coupled to a control voltage input, which can provide a high voltage to enable the switching arm and a low voltage to disable the switching arm. In one approach, IMD can be reduced by increasing the number of FETs in each switching arm. However, increasing the number of FETs in each switching arm undesirably increases the semiconductor die area consumed by the switching device and signal loss in the switching device. In another approach, IMD distortion can be reduced by utilizing a charge pump to increase the high voltage that is utilized to enable the switching arms. However, this approach can undesirably increase the cost of the switching device.

SUMMARY OF THE INVENTION

Switching device with selectable phase shifting modes for reduced intermodulation distortion, substantially as shown in and/or described in connection with at least one of the figures, as set forth more completely in the claims.

DETAILED DESCRIPTION OF THE INVENTION

The present invention is directed to a switching device with selectable phase shifting modes for reduced intermodulation distortion. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention which use the principles of the present invention are not specifically described in the present application and are not specifically illustrated by the present drawings.

Figure 1:
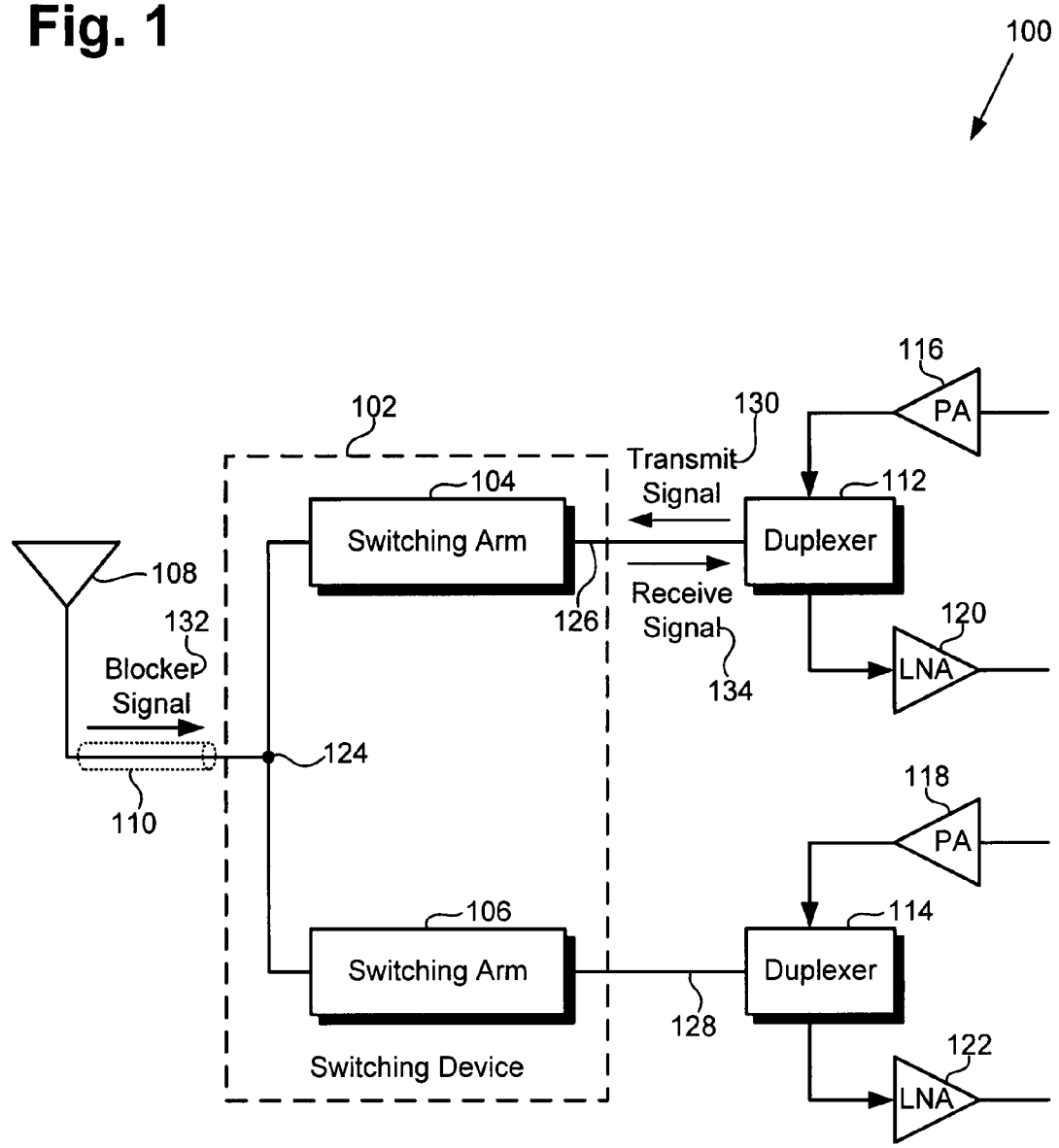
FIG. 1 illustrates a diagram of an exemplary communication system including an exemplary switching device in accordance with one embodiment of the present invention.

FIG. 1 shows a block diagram of communication system 100 in accordance with one embodiment of the present invention. Certain details and features have been left out of FIG. 1, which are apparent to a person of ordinary skill in the art. Communication system 100 includes switching device 102, which includes switching arms 104 and 106, antenna 108, transmission line 110, duplexers 112 and 114, power amplifiers 116 and 118, and low noise amplifiers (LNAs) 120 and 122. Communication system 100 can be, for example, a wireless communication system and can utilize GSM, Wideband Code Division Multiple Access (W-CDMA), or other suitable communications standards. Switching device 102 can be a high frequency switching device, such as an RF switching device, and can be configured to coupled duplexer 112 to antenna 108 when switching arm 104 is selected or to couple duplexer 114 to antenna 108 when switching arm 106 is selected. In other embodiments, switching device 102 can include more than two switching arms.

As shown in FIG. 1, antenna 108 is coupled by transmission line 110 to the outputs of switching arms 104 and 106 at node 124, which forms a shared output of switching device 102. Also shown in FIG. 1, the input of switching arm 104 is coupled to the antenna port of duplexer 112 via line 126, the transmit port of duplexer 112 is coupled to the output of power amplifier 116, and the receive port of duplexer 112 is coupled to the input of LNA 120. Further shown in FIG. 1, the input of switching arm 106 is coupled to the antenna port of duplexer 114 via line 128, the transmit port of duplexer 114 is coupled to the output of power amplifier 118, and the receive port of duplexer 114 is coupled to the input of LNA 122. Power amplifiers 116 and 118 can each provide an RF signal having a different frequency for operation in a particular communication band. For example, power amplifier 116 can provide a 900.0 MHz signal for operation in a GSM low band and power amplifier 118 can provide an 1800.0 MHz signal for operation in a GSM high band.

During operation of communication system 100, either switching arm 104 of switching device 102 is selected, i.e., enabled, and switching arm 106 is disabled, or vice versa. When switching arm 104 is enabled and switching arm 106 is disabled, transmit signal 130, which is outputted by power amplifier 116, is coupled from an input of switching device 102 to antenna 108 via switching arm 104. The IMD (intermodulation distortion) performance, such as third-order intermodulation distortion (IMD3) performance, of switching device 102 can be adversely affected by an out-of-band blocker signal, such as out-of-band blocker signal 132 (also referred to simply as "blocker signal 132"). Blocker signal 132, which can be coupled from antenna 108 to the output of switching device 102 via transmission line 110, can be combined with transmit signal 130 in switching arm 104 and form an IMD3 product. If the IMD3 product is in the receive frequency band of LNA 120, the IMD3 product can interfere with receive signal 134, which is coupled from antenna 108 to LNA 120 via switching arm 104 and duplexer 112.

The IMD3 product produced by a switching device, such as switching device 102, can be affected by a phase shift that can occur between an antenna, such as antenna 108, and the switching device. For example, the IMD3 product may be reduced for some degrees of phase shift between the antenna and the switching device, such as 45.0 degrees, 105.0 degrees, and 180.0 degrees, while the IMD3 product may be increased for other degrees of phase shift, such as 0.0 degrees, 75.0 degrees, and 150.0 degrees. However, in a particular application, such as communication system 100, the phase shift between the antenna, such as antenna 108, and the switching device, such as switching device 102, is fixed by, for example, the impedance of the transmission line coupling the antenna to the switching device, such as transmission line 110.

In an embodiment of the present invention, switching device 102 can operate in one of at least two selectable phase shifting modes. When a first phase shifting mode is selected, for example, a first phase shifting switching branch (not shown in FIG. 1) of a selected switching arm can be enabled and a second phase shifting switching branch (not shown in FIG. 1) of the selected switching arm can be disabled. When a second phase shifting mode is selected, for example, the first phase shifting switching branch of the selected switching arm can be disabled and the second phase shifting switching branch can be disabled. The first phase shifting switching branch of the selected switching arm in switching device 102 can comprise a transmission line (not shown in FIG. 1), which can shift the phase of the switching device by a predetermined amount, such as, for example, 45.0 degrees. The second phase shifting switching branch of the selected switching arm can comprise at least one FET and can provide approximately 0.0 degrees of phase shift. In other words, the at least one FET in the second phase shifting switching branch does not significantly shift or alter the phase of the switching device.

In the present embodiment, IMD3 can be reduced by selecting the particular phase shifting mode of the selected switching arm that provides the greatest amount of attenuation of an out-of-band blocking signal, such as blocker signal 132. For example, if the first phase shifting switching branch of the selected switching arm provides greater attenuation of the blocker signal than the second phase shifting switching branch, the first phase shifting mode can be selected, and vice versa. Thus, an embodiment of the invention's switching device 102 can be advantageously tuned for reduced IMD3, i.e., increased IMD3 performance, by appropriately selecting one of at least two phase shifting modes so as to enable a corresponding phase shifting switching branch in a selected switching arm of the switching device. Embodiments of the invention's switching device are further discussed below in relation to FIGS. 2, 3, 4, and 5.

Figure 2:
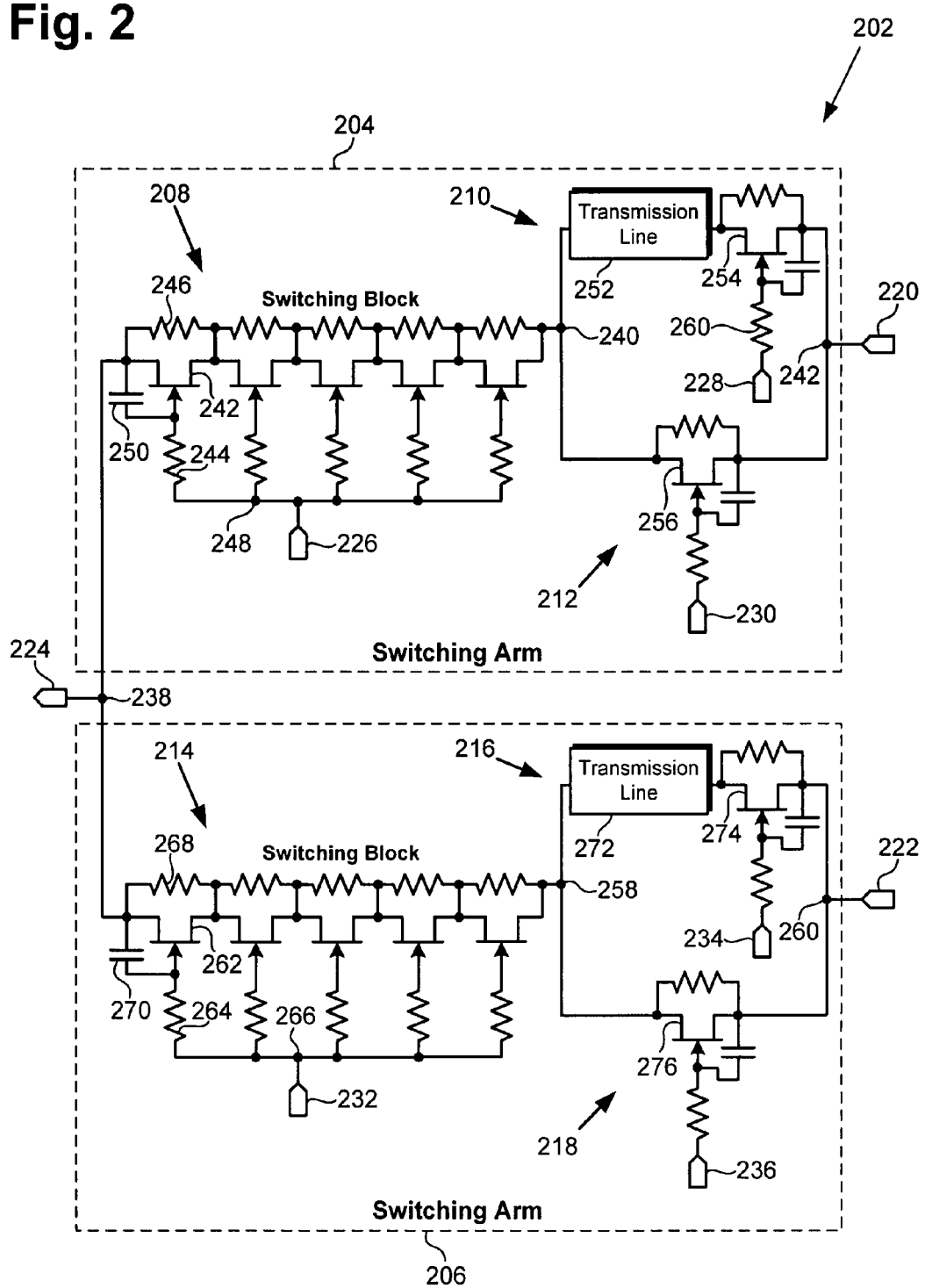
FIG. 2 illustrates a diagram of an exemplary switching device in accordance with one embodiment of the present invention.

FIG. 2 shows a schematic diagram of switching device 202 in accordance with one embodiment of the present invention. In FIG. 2, switching device 202 and switching arms 204 and 206 correspond, respectively, to switching device 102 and switching arms 104 and 106 in communication system 100 in FIG. 1. Switching device 202 includes switching arm 204, which includes switching block 208 and phase shifting switching branches 210 and 212, and switching arm 206, which includes switching block 214 and phase shifting switching branches 216 and 218. Switching device 202 also includes signal inputs 220 and 222 and signal output 224, which is also referred to as a "shared output" in the present application, and control voltage inputs 226, 228, 230, 232, 234, and 236. Switching device 202 can be fabricated on a single semiconductor die.

As shown in FIG. 2, switching arms 204 and 206 are coupled between signal output 224 and respective signal inputs 220 and 222 of switching device 202. In switching arm 204, a first terminal of switching block 208 is coupled to signal output 224 at node 238, a second terminal of switching block 208 is coupled to first terminals of phase shifting switching branches 210 and 212 at node 240, and second terminals of phase shifting switching branches 210 and 212 are coupled to signal input 220 at node 242. Thus, phase shifting switching branches 210 and 212 are coupled in parallel between nodes 240 and 242.

Also shown in FIG. 2, switching block 208 includes a number of FETs, such as FET 242, which are coupled together in series between nodes 238 and 240. Each FET in switching block 208 can be, for example, an NFET. In the present embodiment, switching block 208 can comprise five FETs. In other embodiments, switching block 208 can comprise two or more series-coupled FETs. In switching block 208, a resistor, such as resistor 244, couples the gate of each FET to control voltage input 226 at node 248 and a resistor, such as resistor 246, is coupled between drain and source of each FET. Switching block 208 also includes capacitor 250, which is coupled between drain and gate of FET 242.

Further shown in FIG. 2, phase shifting switching branch 210 includes transmission line 252, which has a first terminal coupled to switching block 208 at node 240 and a second terminal coupled to the drain of FET 254. In phase shifting switching branch 210, a resistor, such as resistor 244, couples the gate of FET 254 to control voltage input 228 and a resistor, such as resistor 246, is coupled between drain and source of FET 254. Transmission line 252 can be selected to provide a desired degree of phase shift in a signal, such as an RF signal, that passes from signal input 220 to signal output 224 via transmission line 252 when phase shifting switching branch 210 is enabled. The degree of phase shift provided by transmission line 252 is dependent on the length of the transmission line and the frequency of the signal passing through the transmission line.

Phase shifting switching branch 210 also includes a capacitor, such as capacitor 250, which is coupled between the gate and source of FET 254, which can be, for example, an NFET. In one embodiment, the positions of transmission line 252 and FET 254 can be reversed. In other words, the drain of FET 254 can be coupled to switching block 208 at node 240, a first terminal of transmission line 252 can be coupled to the source of FET 254, and a second terminal of transmission line 252 can be coupled to signal input 220 at node 242. In another embodiment, transmission line 252 can be coupled between two or more FETs, such as FET 254. In other embodiments, phase shifting switching branch 210 can include more than one FET coupled in series with either a first or a second terminal of transmission line 252.

Also shown in FIG. 2, phase shifting switching branch 212 include FET 256, which is coupled between switching block 208 at node 240 and signal input 220 at node 242. In phase shifting switching branch 212, a resistor, such as resistor 244, couples the gate of FET 256 to control voltage input 230 and a resistor, such as resistor 246, is coupled between drain and source of FET 256. Phase shifting switching branch 212 also includes a capacitor, such as capacitor 250, which is coupled between the gate and source of FET 256. FET 256 can be, for example, an NFET. In one embodiment, phase shifting switching branch 212 can comprise two or more series-coupled FETs.

Further shown in FIG. 2, in switching arm 206, a first terminal of switching block 214 is coupled to signal output 224 at node 238, a second terminal of switching block 214 is coupled to first terminals of phase shifting switching branches 216 and 218 at node 258, and second terminals of phase shifting switching branches 216 and 218 are coupled to signal input 222 at node 260. Also shown in FIG. 2, switching block 214 includes a number of FETs, such as FET 262, which are coupled together in series between nodes 238 and 258. Each FET in switching block 214 can be, for example, an NFET. In the present embodiment, switching block 214 can comprise five FETs. In other embodiments, switching block 214 can comprise two or more series-coupled FETs. In switching block 214, a resistor, such as resistor 264, couples the gate of each FET to control voltage input 232 at node 266 and a resistor, such as resistor 268, is coupled between drain and source of each FET. Switching block 214 also includes capacitor 270, which is coupled between drain and gate of FET 262.

Further shown in FIG. 2, phase shifting switching branch 216 includes transmission line 272, which has a first terminal coupled to switching block 214 at node 258 and a second terminal coupled to the drain of FET 274. In phase shifting switching branch 216, a resistor, such as resistor 264, couples the gate of FET 274 to control voltage input 234 and a resistor, such as resistor 268, is coupled between drain and source of FET 274. Transmission line 272 can be selected to provide a desired degree of phase shift in a signal, such as an RF signal, that passes from signal input 222 to signal output 224 via transmission line 272 when phase shifting switching branch 216 is enabled. Similar to transmission line 252, the degree of phase shift provided by transmission line 272 is dependent on the length of the transmission line and the frequency of the signal passing through the transmission line. In the present embodiment, transmission line 272 can provide approximately the same degree of phase shift as transmission line 252 in phase shifting switching branch 210. In another embodiment, transmission line 272 can provide a different degree of phase shift compared to transmission line 252.

Phase shifting switching branch 216 also includes a capacitor, such as capacitor 270, which is coupled between the gate and source of FET 274, which can be, for example, an NFET. In one embodiment, the positions of transmission line 272 and FET 274 can be reversed. In other words, the drain of FET 274 can be coupled to switching block 214 at node 258, a first terminal of transmission line 272 can be coupled to the source of FET 274, and a second terminal of transmission line 272 can be coupled to signal input 222 at node 260. In another embodiment, transmission line 272 can be coupled between two or more FETs, such as FET 274. In other embodiments, phase shifting switching branch 216 can include more than one FET coupled in series with either a first or a second terminal of transmission line 272.

Also shown in FIG. 2, phase shifting switching branch 218 include FET 276, which is coupled between switching block 214 at node 258 and signal input 222 at node 260. In phase shifting switching branch 218, a resistor, such as resistor 264, couples the gate of FET 276 to control voltage input 236 and a resistor, such as resistor 268, is coupled between drain and source of FET 276. Phase shifting switching branch 218 also includes a capacitor, such as capacitor 270, which is coupled between the gate and source of FET 276. FET 256 can be, for example, an NFET. In one embodiment, phase shifting switching branch 218 can comprise two or more series-coupled FETs.

In switching arm 204, control voltage inputs 226, 228, and 230 can each receive a high control voltage (VH) to select, i.e., enable, or a low control voltage (VL) to disable respective switching block 208 and phase shifting switching branches 210 and 212. Similarly, in switching arm 206, control voltage inputs 232, 234, and 236 can each receive VH to select or VL to disable respective switching block 214 and phase shifting switching branches 216 and 218. VH can be, for example, between approximately 3.0 volts and approximately 7.0 volts and VL can be, for example, approximately 0.0 volts. Control voltage inputs 228, 230, 234, and 236 are also referred to as "phase selection terminals" in the present application.

The operation of switching device 202 will now be discussed with reference to communication system 100 in FIG. 1, where antenna 108 is coupled by transmission line 110 to signal output 224 of switching device 202 and transmit signal 130 from power amplifier 116 is coupled via duplexer 112 to signal input 220 of switching device 202. For the following discussion, switching device 202 is in an operating state in which switching arm 204 is selected, i.e., enabled, and switching arm 206 is deselected, i.e., disabled. However, the following discussion can also be applied to an operating state of switching device 202 in which switching arm 206 is selected and switching arm 204 is disabled.

Switching arm 204 can be selected by applying VH, i.e., a high control voltage, to control voltage input 226 to enable switching block 208 and by selecting one of two phase shifting modes. For example, a first phase shifting mode can be selected by applying VH to a first phase selection terminal, i.e., control voltage input 228, to enable phase shifting switching branch 210 and by applying VL, i.e., a low control voltage, to a second phase selection terminal, i.e., control voltage input 230, to disable phase shifting switching branch 212. For example, a second phase shifting mode can be selected by applying VL to the first phase selection terminal to disable phase shifting switching branch 210 and by applying VH to the second phase selection terminal to enable phase shifting switching branch 212.

As discussed above, the IMD3 (third-order intermodulation distortion) produced by switching device 202 as a result of the interaction between an out-of-band blocker signal, e.g., blocker signal 132 in FIG. 1, which is coupled to signal output 224 from antenna 108, and transmit signal 130, which is coupled to signal input 220, is affected by the phase shift between antenna 108 and signal output 224. For example, a phase shift of 45.0 degrees between antenna 108 and signal output 224 might result in a lower level of IMD3 while a phase shift of 75.0 degrees might result in a higher level of IMD3. In the present embodiment, switching device 202 can be tuned by selecting whichever phase shifting mode results in a greater attenuation of blocker signal 132 and, thereby, providing a lower level of IMD3. In the first phase shifting mode, phase shifting switching branch 210 is enabled, thereby causing a pre-determined amount of phase shift provided by transmission line 252 to be added to the existing amount of phase shift between antenna 108 and signal output 224. In the second phase shifting mode, phase shifting switching branch 212 is enabled, thereby adding substantially 0.0 degrees of phase shift to the existing phase shift between antenna 108 and signal output 224.

When switching arm 204 is selected, switching arm 206 can be disabled by applying VL to control voltage inputs 232, 234, and 236 to disable respective switching block 214 and phase shifting switching branches 216 and 218. When switching arm 204 is selected, signal input 220 is coupled to signal output 224 such that an RF signal, e.g., transmit signal 130, at signal input 220 is allowed to pass through either phase shifting switching branch 210 or phase shifting switching branch 212 (depending on which phase shifting mode is selected) and switching block 208 to signal output 224. The RF signal at signal output 224 provides a peak RF voltage (Vrf) at node 238, which is equally divided between gate/drain and gate/source junctions of each FET in switching block 214. Switching block 214 (or switching block 208 when switching arm 206 is selected) requires a sufficient number of series-coupled FETs to prevent the voltage at the gate/drain and gate/source junctions of the FETs in the switching block from causing the FET bias voltage to approach the pinch-off voltage and, thereby, increasing harmonic generation and decreasing IMD performance.

A conventional switching device can include two switching arms, where each switching arm can include a number of series-coupled FETs. In one approach, IMD3 can be reduced in the conventional switching device by increasing the number of FETs in each switching arm. However, this approach can undesirably increase die size and increase signal loss in the switching device. In another approach, a charge pump can be utilized to increase the control voltage that is utilized to enable the selected switching arm, which can decrease IMD3 by preventing the bias voltage on the FETs in the disabled switching arm from reaching the pinch-off voltage. However, the charge pump can increase cost and die size and can require complicated technology for implementation.

By providing selectable phase shifting modes to tune a switching device for reduced IMD3, the invention's switching device advantageously achieves increased IMD3 performance while avoiding the undesirable effects, such as increased cost, die size, and signal loss and implementation complications, that can result from utilizing conventional approaches for reducing IMD3 in a conventional switching device.

Figure 3:
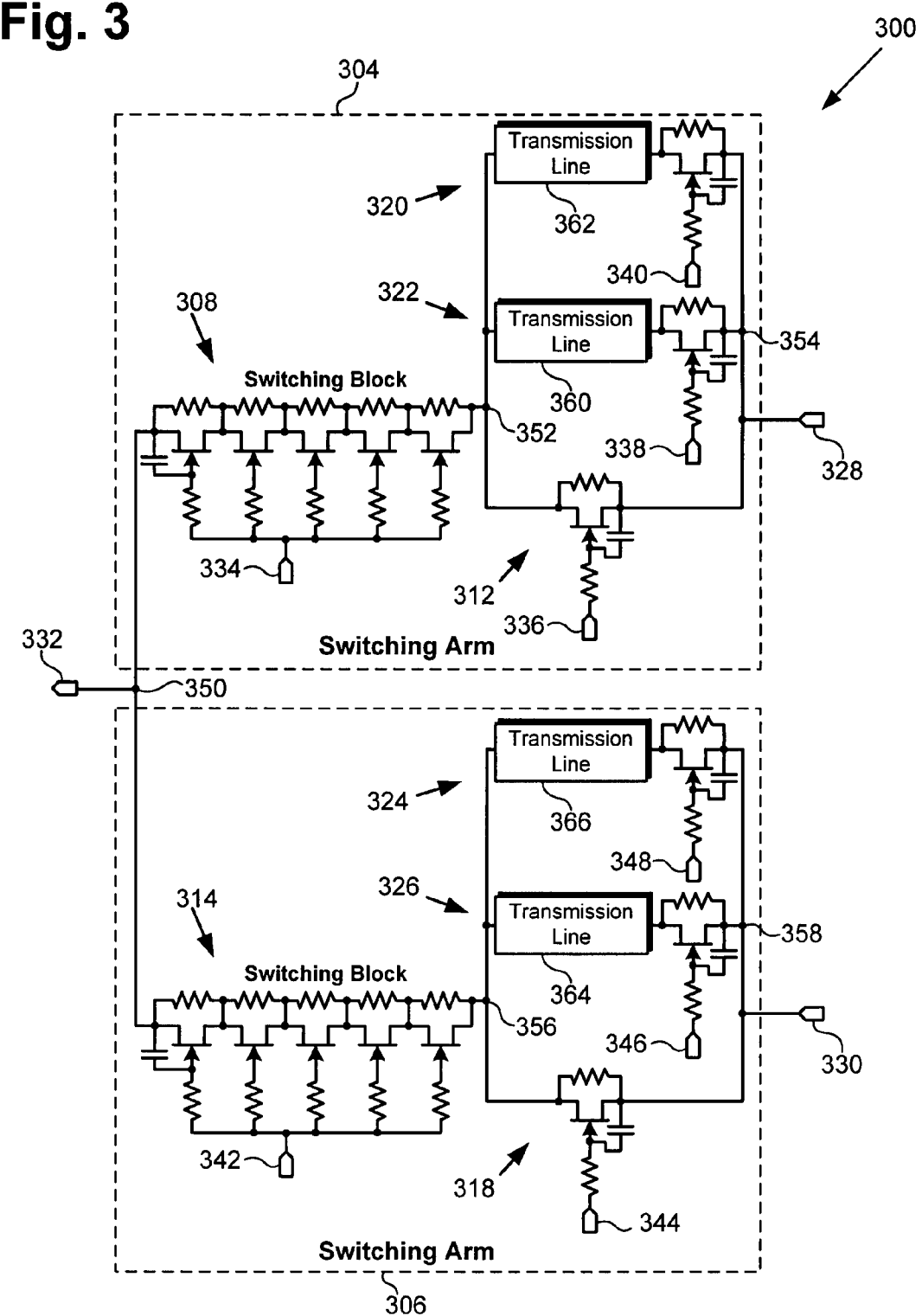
FIG. 3 illustrates a diagram of an exemplary switching device in accordance with another embodiment of the present invention.

FIG. 3 shows a schematic diagram of switching device 300 in accordance with one embodiment of the present invention. In FIG. 3, switching blocks 308 and 314 and phase shifting switching branches 312 and 318 in switching device 300 correspond, respectively, to switching blocks 208 and 214 and phase shifting switching branches 212 and 218 in switching device 202 in FIG. 2. Also, except for the amount of phase shift that each phase shifting switching branch provides, phase shifting switching branches 320 and 322 in switching arm 304 in switching device 300 each correspond to phase shifting switching branch 210 in switching arm 204 in switching device 202 and phase shifting switching branches 324 and 326 in switching arm 306 in switching device 300 each correspond to phase shifting switching branch 216 in switching arm 206 in switching device 202. Switching device 300 can be utilized in a communication system, such as communication system 100 in FIG. 1, to selective couple two or more duplexers, such as duplexers 112 and 114, to an antenna, such as antenna 108. Switching device 300 can also be utilized in other applications that require a high frequency switching device with reduced IMD3.

Switching device 300 includes switching arm 304, which includes switching block 308, phase shifting switching branches 312, 320, and 322, and switching arm 306, which includes switching block 314 and phase shifting switching branches 318, 324, and 326. Switching device 300 also includes signal inputs 328 and 330, and signal output 332, which is also referred to as a "shared output" in the present application, and control voltage inputs 334, 336, 338, 340, 342, 344, 346, and 348. Control voltage inputs 336, 338, 340, 344, 346, and 348 are also referred to as "phase selection terminals" in the present application. Switching device 300 can be fabricated on a single semiconductor die.

As shown in FIG. 3, switching arms 304 and 306 are coupled between signal output 332 and respective signal inputs 328 and 330 of switching device 300. In switching arm 304, switching block 308 is coupled between nodes 350 and 352 and phase shifting switching branches 312, 320, and 322 are coupled in parallel between node 352 and signal input 328 at node 354. Phase shifting switching branches 320 and 322 includes respective transmission lines 362 and 360, which can provide different degrees of phase shift. In switching arm 306, switching block 314 is coupled between nodes 350 and 356 and phase shifting switching branches 318, 324, and 326 are coupled in parallel between node 356 and signal input 330 at node 358. Phase shifting switching branches 324 and 326 includes respective transmission lines 366 and 364, which can provide different degrees of phase shift. In one embodiment, the positions of the transmission line and the FET in each of phase shifting switching branches 320, 322, 324, and 326 can be reversed. In other words, the transmission line can be coupled between a signal input of switching device 300 and the FET in each of phase shifting switching branches 320, 322, 324, and 326.

Transmission lines 360 and 362 can each be selected to provide a desired degree of phase shift in a signal, such as an RF signal, that passes from signal input 328 to signal output 332 when respective phase shifting switching branches 322 and 320 are enabled. Similarly, transmission lines 364 and 366 can each be selected to provide a desired degree of phase shift in an RF signal that passes from signal input 330 to signal output 332 when respective phase shifting switching branches 326 and 324 are enabled.

In contrast to switching device 202, switching device 300 includes an additional phase shifting switching branch in each switching arm. Thus, during operation, an additional phase shifting mode can be selected in switching device 300 compared to switching device 202 to reduced IMD in the switching device. In switching device 300, switching arm 304 can be selected by applying VH, i.e., a high control voltage, to control voltage input 334 to enable switching block 308 and by selecting one of three phase shifting modes. For example, a first phase shifting mode can be selected by applying VH to a first phase selection terminal, i.e., control voltage input 336, to enable phase shifting switching branch 312, a second phase shifting mode can be selected by applying VH to a second phase selection terminal, i.e., control voltage input 338, to enable phase shifting switching branch 322, or a third phase shifting mode can be selected by applying VH to a third phase selection terminal, i.e., control voltage input 340, to enable phase shifting switching branch 320. When a particular phase shifting mode is selected, the unselected phase shifting switching branches can be disabled by applying VL to the respective phase selection terminals of the unselected phase shifting switching branches. In other embodiments, the invention's switching device may include more than three phase shifting modes.

The first phase shifting mode can provide an approximate 0.0 degree phase shift, the second phase shifting mode can provide a phase shift that is determined by transmission line 360 in phase shifting switching branch 322, and the third phase shifting mode can provide a phase shift that is determined by transmission line 362 in phase shifting switching branch 320. By utilizing an additional phase shifting switching branch with an additional transmission line, switching device 300 can provide a smaller phase adjustment step compared to switching device 202 in FIG. 2. As a result, the phase of switching device 300 can be more finely tuned to achieve reduced IMD, such as IMD3. Switching device 300 also provides similar advantages as discussed above in relation to switching device 200.

Figure 4:
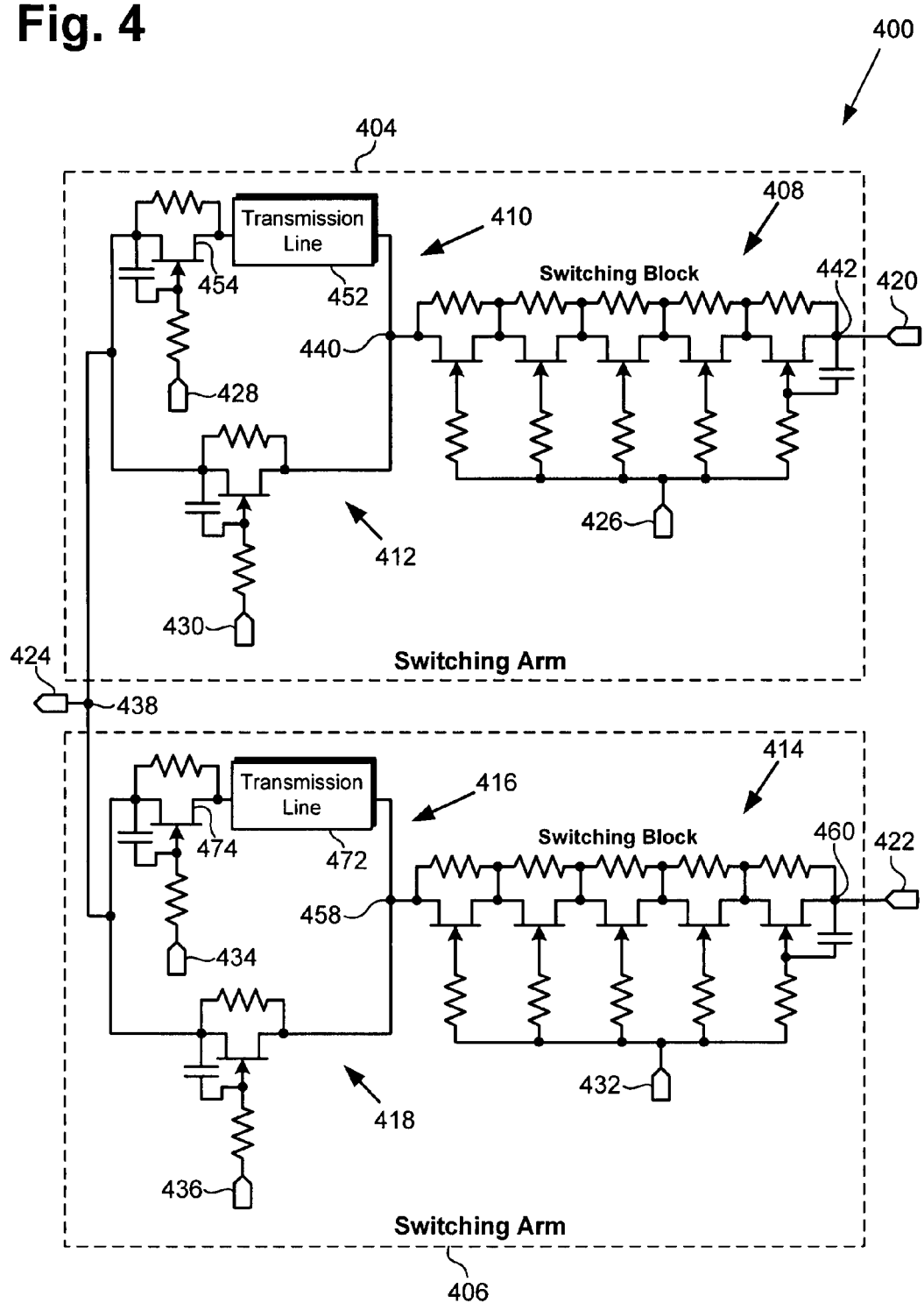
FIG. 4 illustrates a diagram of an exemplary switching device in accordance with another embodiment of the present invention.

FIG. 4 shows a schematic diagram of switching device 400 in accordance with one embodiment of the present invention. In FIG. 4, switching blocks 408 and 414, phase shifting switching branches 412 and 418, signal inputs 420 and 422, signal output 424, and control voltage inputs 426, 428, 430, 432, 434, and 436 in switching device 400 correspond, respectively, to switching blocks 208 and 214, phase shifting switching branches 212 and 218, signal inputs 220 and 222, signal output 224, and control voltage inputs 226, 228, 230, 232, 234, and 236 in switching device 202 in FIG. 2. Also, transmission lines 452 and 472 and FETs 454 and 474 in respective phase shifting switching branches 410 and 416 in FIG. 4 correspond, respectively, to transmission lines 252 and 272 and FETs 254 and 274 in respective phase shifting switching branches 210 and 216 in FIG. 2. In one embodiment, the positions of the transmission line and FET in each of phase shifting switching branches 410 and 416 can be switched such that a terminal of the transmission line is coupled directly to signal output 424 at node 438.

Switching device 400 includes switching arm 404, which includes switching block 408 and phase shifting switching branches 410 and 412, and switching arm 406, which includes switching block 414 and phase shifting switching branches 416 and 418. Switching device 400, which can be fabricated on a single semiconductor die, can be utilized in a communication system, such as communication system 100 in FIG. 1, to selective couple two or more duplexers, such as duplexers 112 and 114, to an antenna, such as antenna 108. However, switching device 400 can also be utilized in other applications that require a high frequency switching device with reduced IMD3.

As shown in FIG. 4, in switching arm 404, phase shifting switching branches 410 and 412 are coupled between signal output 424 at node 438 and a first terminal of switching block 408 at node 440, and a second terminal of switching block 408 is coupled to signal input 420 at node 442. In switching arm 406, phase shifting switching branches 416 and 418 are coupled between signal output 424 at node 438 and a first terminal of switching block 414 at node 458, and a second terminal of switching block 414 is coupled to signal input 422 at node 460. Thus, the switching block and phase shifting switching branches in each switching arm of switching device 400 are coupled together in a different configuration compared to the switching block and phase shifting switching branches in each switching arm of switching device 202 in FIG. 2. However, the operation of switching device 400 is similar to the operation of switching device 202 as discussed above. Thus, in a similar manner as discussed above, switching device 400 also provides two selectable phase shifting modes to tune the switching device for reduced IMD3, thereby advantageously achieving increased IMD performance.

Figure 5:
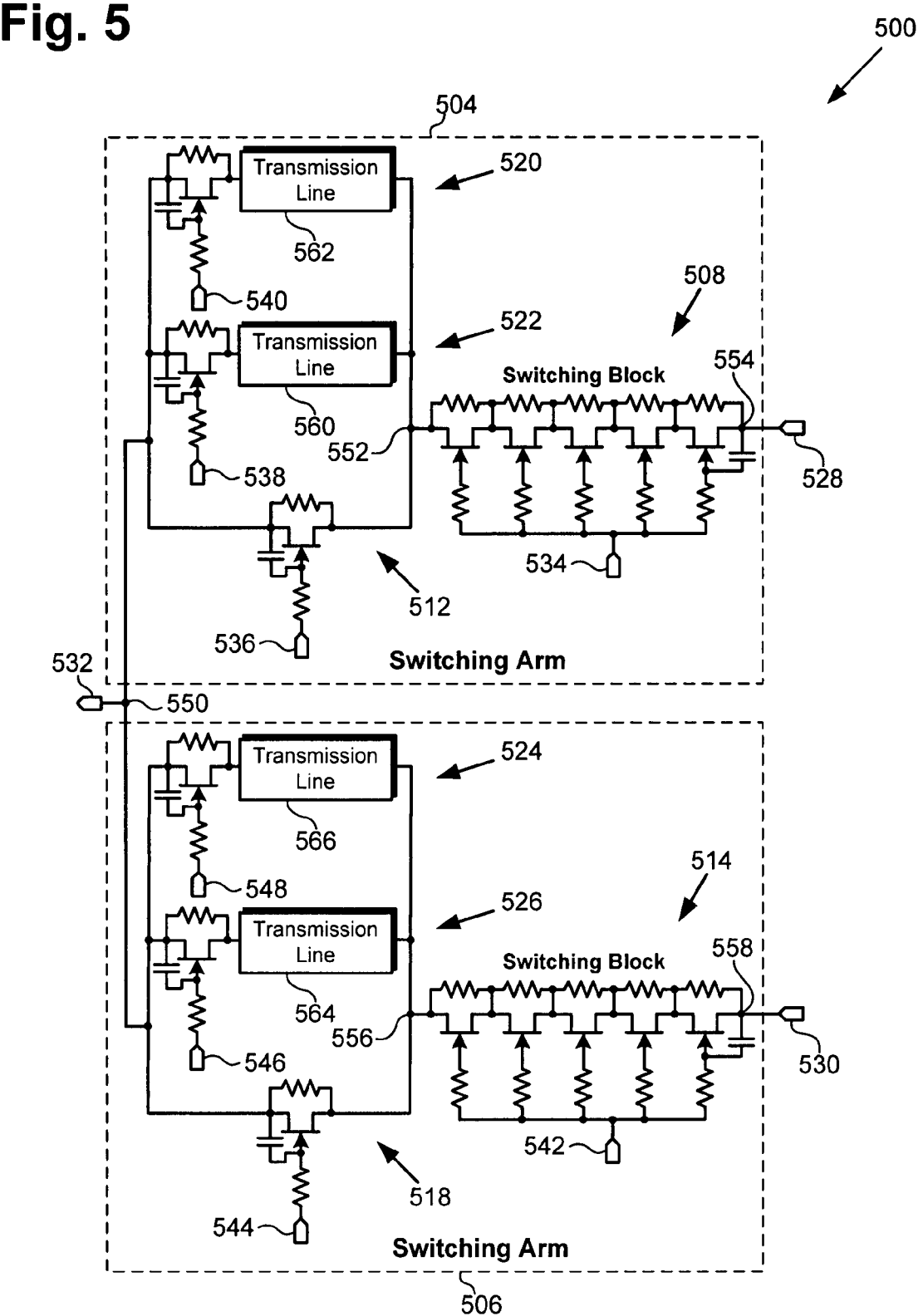
FIG. 5 illustrates a diagram of an exemplary switching device in accordance with another embodiment of the present invention.

FIG. 5 shows a schematic diagram of switching device 500 in accordance with one embodiment of the present invention. In FIG. 5, switching blocks 508 and 514, phase shifting switching branches 512 and 518, signal inputs 528 and 530, signal output 532, and control voltage inputs 534, 536, 538, 540, 542, 544, 546, and 548 in switching device 500 correspond, respectively, to switching blocks 308 and 314, phase shifting switching branches 312 and 318, signal inputs 328 and 330, signal output 332, and control voltage inputs 334, 336, 338, 340, 342, 344, 346, and 348 in switching device 300 in FIG. 3. Also, transmission lines 560, 562, 564, and 566 in switching device 500 correspond, respectively, to transmission lines 360, 362, 364, and 366 in switching device 300.

Switching device 500 includes switching arm 504, which includes switching block 508 and phase shifting switching branches 512, 520, and 522, and switching arm 506, which includes switching block 514 and phase shifting switching branches 518, 524, and 526. Switching device 500, which can be fabricated on a single semiconductor die, can be utilized in a communication system, such as communication system 100 in FIG. 1, to selective couple two or more duplexers, such as duplexers 112 and 114, to an antenna, such as antenna 108. However, switching device 400 can also be utilized in other applications that require a high frequency switching device with reduced IMD3.

As shown in FIG. 5, in switching arm 504, phase shifting switching branches 512, 522, and 520 are coupled between signal output 532 at node 550 and a first terminal of switching block 508 at node 552, and a second terminal of switching block 508 is coupled to signal input 528 at node 554. In switching arm 506, phase shifting switching branches 518, 524, and 526 are coupled between signal output 532 at node 550 and a first terminal of switching block 514 at node 556, and a second terminal of switching block 514 is coupled to signal input 530 at node 558. In one embodiment, the positions of the transmission line and FET in each of phase shifting switching branches 520, 522, 524, and 526 can be switched such that a terminal of the transmission line is coupled directly to signal output 532 at node 550.

Thus, the switching block and phase shifting switching branches in each switching arm of switching device 500 are coupled together in a different configuration compared to the switching block and phase shifting switching branches in each switching arm of switching device 300 in FIG. 3. However, the operation of switching device 500 is similar to the operation of switching device 300 as discussed above. Thus, in a similar manner as discussed above, switching device 500 also provides three selectable phase shifting modes to tune the switching device for reduced IMD3, thereby advantageously achieving increased IMD performance.

Thus, as discussed above in the embodiments in FIGS. 1 through 5, the invention provides a switching device, such as a high frequency switching device, having selectable switching arms with multiple selectable phase shifting modes. By appropriately selecting one of the phase shifting modes in a selected switching arm, the phase of the invention's switching device can be tuned to reduce IMD3 in the switching device, thereby advantageously improving IMD performance.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a switching device with selectable phase shifting modes for reduced intermodulation distortion has been described.

The invention claimed is:

1. A switching device with phase selection terminals to select between at least two phase shifting modes to reduce intermodulation distortion in said switching device, said switching device comprising:
   a first phase selection terminal to select a first phase shifting mode of said switching device by enabling a first transmission line in a first phase shifting switching branch;
   a second phase selection terminal to select a second phase shifting mode of said switching device by enabling a second phase shifting switching branch;
   wherein said intermodulation distortion is reduced by selecting one of said first and second phase shifting modes.

2. The switching device of claim 1, wherein said first transmission line is enabled by enabling a FET coupled in series with said first transmission line in said first phase shifting switching branch.

3. The switching device of claim 1, wherein said second phase shifting mode of said switching device is selected by enabling a FET in said second phase shifting switching branch.

4. The switching device of claim 1 further comprising a plurality of FETs coupled in series between an output of said switching device and said first and second phase shifting switching branches.

5. The switching device of claim 1 further comprising a plurality of FETs coupled in series between said first and second phase shifting switching branches and an input of said switching device.

6. The switching device of claim 1, wherein an input of said switching device is coupled to a duplexer.

7. The switching device of claim 1, wherein an output of said switching device is coupled to an antenna.

8. A switching device with reduced intermodulation distortion, said switching device comprising:
   a first switching arm coupled to a first input and a shared output of said switching device;
   said first switching arm comprising a plurality of phase shifting switching branches, a first of said plurality of phase shifting switching branches comprising a first transmission line;
   wherein one of said plurality of phase shifting switching branches is selected when said first switching arm is selected, thereby reducing said intermodulation distortion of said switching device.

9. The switching device of claim 8, wherein said first switching arm further comprises a plurality of FETs coupled in series between said shared output and said plurality of phase shifting switching branches.

10. The switching device of claim 8, wherein said first switching arm further comprises a plurality of FETs coupled between said first input and said plurality of phase shifting switching branches.

11. The switching device of claim 8, wherein said first transmission line is coupled in series with at least one FET in said first phase shifting switching branch.

12. The switching device of claim 8, wherein a second of said plurality of phase shifting branches comprises at least one FET.

13. The switching device of claim 8, wherein a second of said plurality of phase shifting switching branches comprises a second transmission line.

14. The switching device of claim 8 further comprising a second switching arm coupled to a second input and said shared output of said switching device.

15. The switching device of claim 8, wherein said first input is coupled to a duplexer.

16. The switching device of claim 8, wherein said shared output is coupled to an antenna.

17. A communication system comprising:
   a switching device with reduced intermodulation distortion coupled between an antenna and at least one duplexer, said switching device comprising:
   a first switching arm coupled to a first input and a shared output of said switching device;
   said first switching arm comprising a plurality of phase shifting switching branches, a first of said plurality of phase shifting switching branches comprising a first transmission line;
   wherein one of said plurality of phase shifting switching branches is selected when said first switching arm is selected, thereby reducing said intermodulation distortion of said switching device.

18. The communication system of claim 17, wherein said communication system utilizes a communications standard selected from the group consisting of GSM and W-CDMA.

19. The communication system of claim 17, wherein said first switching arm further comprises a plurality of FETs coupled in series between said shared output and said plurality of phase shifting switching branches.

20. The communication system of claim 17, wherein said first transmission line is coupled in series with at least one FET in said first phase shifting switching branch.

* * * * *